United States Patent [19]

Perun

[11] Patent Number: 4,857,698
[45] Date of Patent: Aug. 15, 1989

[54] LASER PERFORATING PROCESS AND ARTICLE PRODUCED THEREIN

[75] Inventor: Kenneth R. Perun, Los Angeles, Calif.

[73] Assignees: McDonnell Douglas Corporation, Long Beach, Calif.; Lumonics, Limited, Rugby, England

[21] Appl. No.: 171,800

[22] Filed: Mar. 22, 1988

Related U.S. Application Data

[63] Continuation of Ser. No. 66,488, Aug. 26, 1988, abandoned.

[51] Int. Cl.$^4$ .............................................. B23K 26/00
[52] U.S. Cl. ........................... 219/121.71; 219/121.84
[58] Field of Search ........... 219/121.7, 121.71, 121.68, 219/121.69, 121.67, 121.72, 121.84

[56] References Cited

U.S. PATENT DOCUMENTS 4,081,653 3/1978 Koo et al. ...................... 219/121.79

FOREIGN PATENT DOCUMENTS 0180687 9/1985 Japan .............................. 214/121.71

Primary Examiner—C. L. Albritton
Attorney, Agent, or Firm—Max Geldin

[57] ABSTRACT

A process for perforating a metal sheet with clean holes of substantially uniform size and shape comprises placing a suitable transparent backing tape, such as an adhesive polyethylene tape, on one surface of the metal sheet. The assembly is placed in a fixture, a laser beam generated by a pulsed Nd:YAG laser is impinged on the opposite surface of the metal sheet, and the laser parameters are chosen to control the laser beam to penetrate the metal sheet and form a plurality of small tapered holes therein without penetrating the tape. A clean metal surface results around the holes with no recast structure or dross present in and around the holes. A drilled titanium sheet of the above type is particularly suited for utility as an outer wing leading edge of an aircraft and which provides good laminar flow control efficiency.

18 Claims, 2 Drawing Sheets fig.4
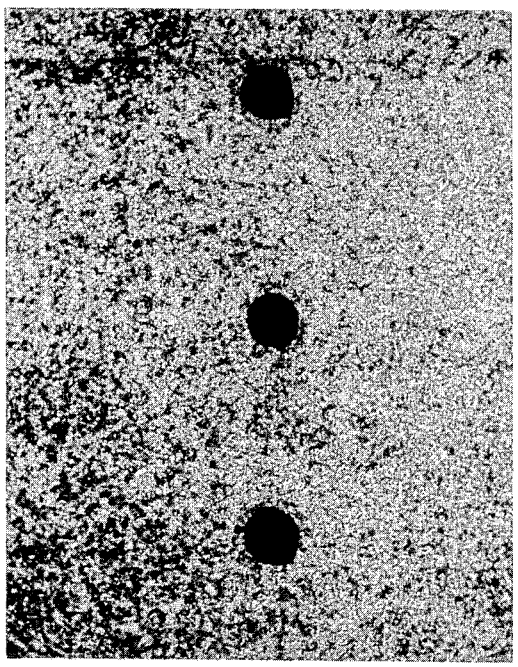
fig.5
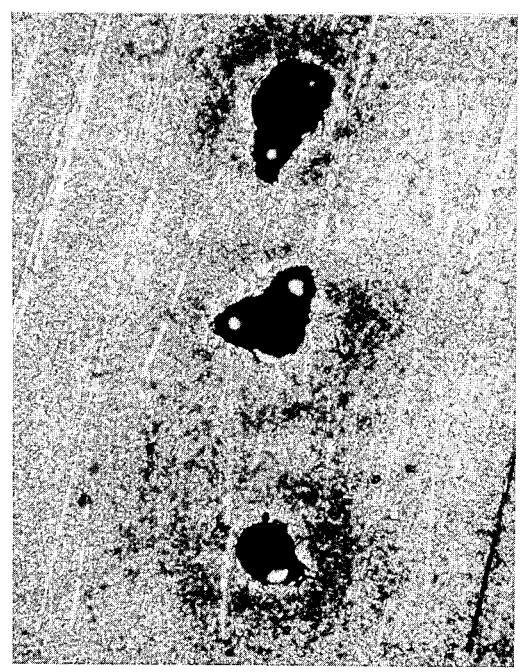
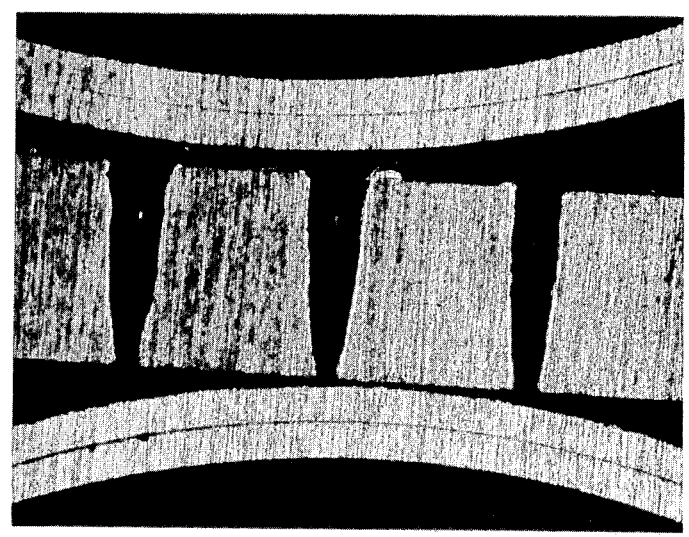
fig.6

LASER PERFORATING PROCESS AND ARTICLE PRODUCED THEREIN

This is a continuation of application Ser. No. 66,488, filed June 26, 1987 now abandoned.

BACKGROUND OF THE INVENTION

This invention relates to a process for perforating materials by means of a laser beam and is particularly directed to a process for producing a large number of small holes in a metal sheet, particularly a titanium sheet, rendering such sheet particularly applicable for laminar flow control when such sheet is employed as a porous wing skin material on aircraft.

It is known to utilize a laser for the purpose of removing metal from a metallic material. Thus, U.S. Pat. No. 4,411,730 discloses a process for machining nickel-base superalloys wherein a laser is used to remove metal, leaving a recast layer, followed by chemical milling of the recast layer.

U.S. Pat. No. 4,368,080 discloses a method of removing rust from the surface of a metal object by focusing a laser beam upon the rust to heat the rust to evaporation temperature to thereby evaporate the rust.

Laminar flow control requirements for porous wing skin material used on aircraft necessitates a reliable and consistent method of producing millions of extremely fine holes of the order of about 0.003 inch in diameter, in titanium, e.g., 0.025" thick titanium 6Al-4V, sheet employed for this purpose. An electron beam perforator has been partially successful in producing such small holes consistently. A laser hole perforating system for this purpose, however, is far less costly and does not require a vacuum chamber, but obtaining the required hole size, shape and quality have presented problems.

Thus, earlier titanium test samples which were laser drilled showed encouraging results. However, inconsistent tapered hole shape, and the presence of undesirable recast material in and around the drilled holes presented problems.

An object of the present invention is the provision of an improved method for drilling very small holes of uniform size and shape in metal sheet.

Another object is to provide an efficient and rapid process for producing a large number of small uniform holes in a titanium sheet, by means of a laser beam, to permit such sheet to be efficiently employed as a laminar flow control wing skin material on aircraft.

Still another object is to provide a process of the foregoing type for producing a large number of small uniform size holes in a metal sheet, such as a titanium sheet, without depositing recast material or dross in or about the holes.

A still further object is to provide a metal, e.g., titanium, perforated sheet by the process of the invention, having particular utility as an outer wing leading edge of an aircraft, and which provides good laminar flow control efficiency.

SUMMARY OF THE INVENTION

The above objects are achieved and an efficient method for laser perforating a metal sheet, such as titanium, with holes of substantially uniform size and shape is provided, by initially placing a suitable transparent backing tape in adhesive contact with one surface of the metal sheet. A laser beam generated preferably by a pulsed Nd:YAG (neodymium doped yttrium aluminum garnet) laser is impinged on the opposite surface of the sheet. The laser beam is controlled, preferably by operation within certain parameters, to penetrate the metal sheet and form a plurality of small holes therein, but without penetrating through the backing tape. Following laser drilling, the backing tape is removed easily from the metal sheet.

In addition to providing a clean metal surface with no slag, the backing tape eliminates the deposition of recast structure or dross in and around the hole. Any recast remaining in the holes undesirably can interrupt suction air flow.

The result is a clean, porous metal, e.g., titanium, surface with holes of extreme uniformity and regularity. Such metallic sheet or surface can be employed as the functional outer wing leading edge of an aircraft which is critical for laminar flow control (LFC) efficiency.

BRIEF DESCRIPTION OF THE DRAWINGS

The invention will be more clearly understood by reference to the description below of certain preferred embodiments, taken in connection with the accompanying drawings wherein:

FIG. 4 is a photomicrograph at 100 magnifications of a titanium sheet perforated according to the invention process by a pulsed Nd:YAG laser, employing an adhesive backing tape for the titanium metal sheet, according to the invention;

FIG. 5 is a photomicrograph at 100 magnifications of a titanium sheet perforated by a pulsed Nd:YAG laser but without employing an adhesive backing tape; and FIG. 6 is a photomicrograph at 50 magnifications, showing a cross-sectional view and tapered shape of laser drilled holes in titanium sheet, the arcuate shaped portions adjacent the top and bottom being mounting clips for holding the sheet in place during the photographic procedure.

DETAILED DESCRIPTION OF THE INVENTION AND PREFERRED EMBODIMENTS

Figure 1:
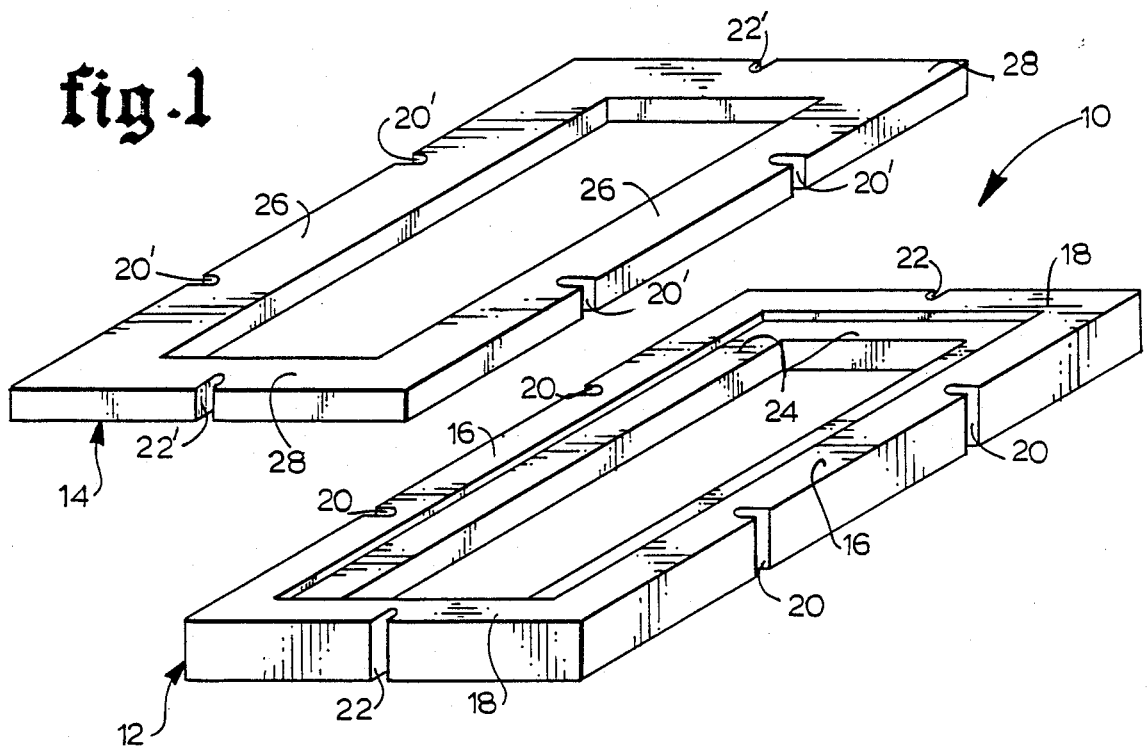
FIG. 1 is an exploded view of a fixturing tool for clamping a titanium sheet containing an adhesive backing tape preparatory to laser drilling, according to the invention.
Figure 2:
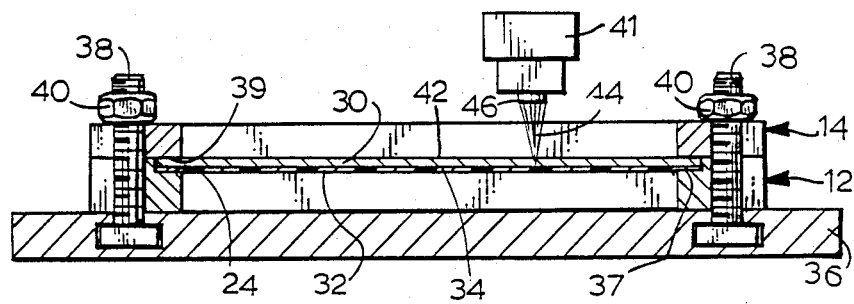
FIG. 2 is an elevational cross-section of the assembled fixturing tool of FIG. 1, containing a titanium sheet and an adhesive backing tape in position for laser drilling.

Referring to FIGS. 1 and 2 of the drawings, numeral 10 indicates a fixture or tool for laser drilling according to the invention, comprised of a bottom portion 12 and a top portion 14, both formed of a suitable material, e.g., aluminum. The bottom portion 12 is in the form of a frame having opposite side members 16 and opposite end members 18, the side members each being provided with a pair of slots 20, and the end members each being provided with a slot 22 in the outer surfaces thereof. The upper surface of the side members 16 and the end members 18 of bottom 12 provided with an accurate NC (numerical control) machined groove 24 extending around the inner edges if such members and around the entire inner periphery thereof.

The top member 14 is in the form of a frame having substantially the same length and width dimensions as the bottom portion 12 and comprised of side members 26 and end members 28. The side members 26 are each provided with a pair of slots 20', and the end members 28 are each provided with a slot 22' in the outer surface thereof. When the top 14 is positioned on the bottom 12, the slots 20' and 22' of the top 14 are positioned to register with the slots 20 and 22, respectively, of the bottom 12, as seen in FIG. 2.

A metal sheet, indicated at 30 in FIG. 2, particularly a titanium sheet to be laser perforated to form an outer wing leading edge of an aircraft, is first provided with a backing tape 32 which is adhesively secured in contact with one surface 34 of the titanium sheet 30. The thickness of the titanium sheet 30 can vary, but in preferred practice for producing a titanium sheet for use as the functional outer wing leading edge of an aircraft, the thickness can range from about 0.020" to about 0.032", an optimum thickness for this purpose being 0.025".

The backing tape which can be utilized is any suitable transparent backing tape, examples of which include the tapes marketed as 3M No. 483 polyethylene film tape and 3M No. 336 polyester tape, both marketed by the 3M Company, and Sellotape, understood to be a cellophane (regenerated cellulose) tape. All are transparent, which provides inspectability of the applied surface, and have an adhesive film on one surface of the tape. Polyethylene tape is preferred due to its good sealing and ease of application to the metal sheet and removal therefrom. In addition, the latter tape has low halogen, e.g., chloride, content. Air gaps at the sealing surface between the tape 32 and the metal sheet 30 are particularly avoided. The backing tape generally has a thickness of about 0.0015" to about 0.005".

After the backing tape 30 has been adhesively secured to the surface 34 of the titanium sheet, the assembly is placed in the peripheral groove 24 of the bottom portion 12 of the fixture, which is supported on a flat CNC (computer numerical control) X-Y table 36, as shown in FIG. 2. It will be noted that the titanium sheet 30 containing the tape 32 has essentially the same length and width dimensions as the groove 24 so that the assembly of the titanium sheet containing the tape 32 is adequately supported within the groove 24, with the outer peripheral edge 37 of the tape 32 in contact with the bottom of the groove. It is also noted that the depth of groove 24 is approximately equal to the thickness of the assembly of the metal sheet 30 and tape 32.

The top 14 of the tool is then positioned over the bottom 12, so that the upper slots 20' and 22' in the top 14 register with the slots 20 and 22 of the bottom, and with the inner peripheral bottom edge 39 of the top member 14 in contact with the outer peripheral top edge of metal sheet 30. Threaded bolts 38 are then passed through such registered slots, the ends thereof being threaded into the table 36, and nuts 40 are threaded on the upper ends of the bolts and tightened to securely maintain the assembly of the titanium sheet 30 and backing tape 32 in fixed position in the tool, as shown in FIG. 2.

A pulsed Nd:YAG laser indicated at 41 is positioned above the upper surface 42 of the titanium sheet 30 for repeatedly drilling a large number of small holes in the titanium sheet, using a single pulse per hole. A pulsed Nd:Glass (meodymium doped glass) laser and a pulsed $CO_2$ laser have been found unsuitable for the purposes of the invention. The laser parameters are chosen to provide a hole diameter of about 0.002" to about 0.004" in the titanium sheet. The ratio of the thickness of the titanium sheet to the hole size generally is about 10:1. The holes which are laser drilled into the titanium sheet 30 are sufficiently small so that they will not cause transition or trap particles and insects onto the suction surface, that would trip the laminar air flow, when the titanium sheet is employed as the functional outer wing leading edge of an aircraft, but are large enough to allow purging in flight of any trapped liquids and to allow cleaning in place.

Hole drilling by the laser is carried out perpendicular to the surface of the titanium sheet. It is preferred during laser operation that a jet of shielding gases, indicated at 44, be discharged through a gas nozzle tip 46 of the laser 41. Such shielding gases can be argon, helium or compressed air. In preferred practice, the shielding gas is an inert gas, such as argon, to aid in preventing oxidation of the surface of the metal, e.g., titanium, sheet 30. Such shielding gases, e.g., at a pressure of 70 psi, also aid in expelling any debris directed back to the focusing lens of the laser during drilling.

Figure 3:
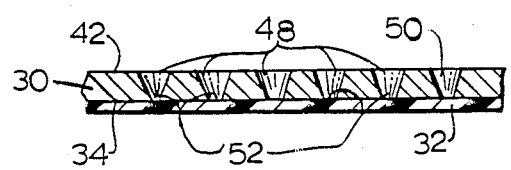
FIG. 3 is an enlarged partial section of the metal sheet following laser perforation thereof in FIG. 2, with the backing tape in contact therewith, and showing the downwardly tapering shape of the holes in the metal sheet.

The laser drilling of the titanium sheet 30 with the backing tape 32 adhered to the sheet, according to the invention, results in the production of a large multiplicity of small holes 48, as seen in FIG. 3, of the size noted above and which are conical in shape, tapering downwardly from the upper surface 42 of the sheet to the lower surface 34 thereof. In preferred practice, the diameter of the holes 48 at the top 50 are twice the diameter at the bottom 52. The range of diameters of the holes 48 noted above corresponds to the diameter at the critical bottom 52 of such holes. This is important to obtain efficient laminar flow when the sheet is employed as an outer wing leading edge in airfcraft.

The use of an adhesive backing tape in conjunction with the metal, e.g., titanium, sheet, expels, absorbs and eliminates any recast structure, dross, or debris in and around the bottom 52 of the holes. The laser beam does not penetrate through the tape, and the end result is a clean porous surface with holes of extremely uniform and regular shape and repeatability. This is illustrated in FIG. 4, showing uniform holes of round regular shape, 0.003" in diameter, produced by laser drilling accoridng to the invention. Note the comparison of the holes produced according to the procedure of the present invention in FIG. 4 as cmpared to the highly irregular holes, as seen in in FIG. 5, produced when employing laser drilling of the same titanium sheet using the same laser parameters but without utilizing the feature of a backing tape in adhesive contact with the opposite side of the titanium sheet during laser drilling.

Due to the focusing of the laser beam in order to The holes formed by the laser beam, as noted above, are tapered. A cross-sectional view in FIG. 6 shows the tapered hole shape of laser drilled holes in titanium sheet, according to the invention.

The unexpected result of the use of the above backing tape is that no recast, slag or debris deposits at the bottom of the hole, any such molten and vaporized material being expelled at the large diameter top of the hole, and the hole shape at the critical bottom of the hole has a very clean consistent circular shape, as noted above and seen in FIG. 4.

Other backing materials, such as hard epoxy and parting compounds, having been tried in place of the transparent backing tapes noted above, in an effort to assist in removing laser slag from the metal sheet surface but were not found satisfactory. In addition to providing a clean metal surface with no slag, the backing tape of the invention eliminates recast in the small end of the hole, which is critical in maintaining laminar flow control efficiency when the sheet is employed as the functional outer wing leading edge on an aircraft.

In order to obtain the advantageous results noted above, it is preferred to utilize the following laser parameters. Employing a Lumonics MS 35 (LD) low divergence pulsed Nd:YAG laser, for example, maximum mean output power ranges from about 35 to about 40 watts. Pulse duration required for one pulse to drill through the metal to form one hole ranges from about 100 to about 150 microseconds. Capacitance charge ranges from about 600 to about 800 volts. Apertures are employed which provide an output ranging from about 400 to about 600 millijoules (MJ). The focal length of the drilling lens can range from about 80 to about 82 mm and the distance of the tip of the nozzle 46 to the metal, e.g., titanium, workpiece surface 42 ranges from about 3.5 to about 5 mm. The pulse repetition rate corresponding to the number of holes drilled per second ranges from about 30 to about 60 Hz (30 to about 60 holes per second).

The fixturing tool 10 maintains laser beam focus and alignment. After laser drilling, the assembly of the drilled metal or titanium workpiece 30 and the backing tape 32 is removed from the tool 10 in FIG. 2, and the backing tape is peeled or stripped readily from the adjacent surface 34 of the metal sheet. The drilled titanium sheet 30 containing the large number of uniform circular holes 48 can be applied to the wing of an aircraft as the functional outer wing leading edge by installing it upside down on the wing, that is, with the lower surface 34 and the small end of the holes 52 facing outward. In this position, the tapered holes 48 expand downward or inward so that any particles sucked through from the surface in flight will not cause clogging.

The following are examples of practice of the invention:

EXAMPLE 1

A 0.025" thick titanium 6A1:4V sheet had adhesively applied to one surface thereof a 3M No. 483 polyethylene tape. The assembly of the sheet and tape was installed in a laser fixturing tool as shown in FIGS. 1 and 2 of the drawings, with the tape adhered to the lower surface of the sheet.

A Lumonics MS 35 (LD) pulsed Nd:YAG laser was positioned above the titanium sheet and was energized to impinge a laser beam on the upper surface of the titanium sheet, drilling a multiplicity of tapered holes in the titanium sheet, as illustrated in FIG. 3, without damaging or penetrating the tape. Argon gas at 70 psi was used as a shielding gas discharged from the laser nozzle tip. The laser holes drilled were of uniform circular shape and size as seen in FIG. 4, having a diameter at the small end of 0.0025", with an absence of any recast material or dross present in or around the bottom of the holes, as contrasted to the highly irregular shape and size of the laser drilled holes, as seen in FIG. 5, using the laser fixturing tool as shown in FIGS. 1 and 2, but without using any tape adhered to the lower surface of the titanium sheet.

The laser parameters employed were as follows:

| | |
|---|---|
| Mean power | 12 watts |
| Pulse duration | 150 microseconds |
| Capacitance charge | 650 volts |
| Aperture "E" -providing output of | 400 mJ |
| Lens focal length | 80 mm |
| Nozzle tip to workpiece separation | 3.65 mm |
| Repitition rate | 30 Hz |

EXAMPLE 2

A 3"×4" titanium sheet of a thickness of 0.028" was used, to which was applied on one surface a 3M 336 polyester tape and the resulting assembly of sheet and tape inserted into a laser fixturing tool, as described and shown.

A Lumonics MS 35 (LD) pulsed Nd:YAG laser system was used to drill holes in the titanium sample as described and shown above, forming a large number of tapered uniform circular holes of 0.003" diameter at their small end. Argon gas at 70 psi was used as a shielding gas. The drilled holes were clean, with no recast or dross deposited in or around the bottom of the holes.

The following were the laser parameters employed:

| | |
|---|---|
| Mean power | 12 watts |
| Pulse duration | 100 microseconds |
| Capacitance charge | 800 volts |
| Aperture "5" providing output of | 400 mJ |
| Lens focal length | 80 mm |
| Nozzle tip to workpiece separation | 4 mm |
| Repitition rate | 30 Hz |

EXAMPLE 3

A laser drilling procedure similar to that described in Example 2 was carried out on another 3"×4" titanium sheet sample employing a pulsed Nd:YAG laser similar to that of Example 2.

Successful hole drilling results were obtained as in Example 2.

The laser parameters used in this procedure are as follows:

| | |
|---|---|
| Mean power | 12 watts |
| Pulse duration | 150 microseconds |
| Capacitance charge | 700 volts |
| Aperture "E" -providing output of | 400 mJ |
| Lens focal length | 80 mm |
| Nozzle tip to workpiece separation | 3.65 mm |
| Repitition rate | 30 Hz |

From the foregoing, it is seen that the invention provides a novel process for drilling a very large number of small, clean, very uniform holes consistently in a metal, particularly titanium, sheet rapidly and efficiently by impinging a laser beam generated by a pulsed Nd:YAG laser on a metal, e.g., titanium, sheet having a suitable transparent backing tape thereon, using a fixturing tool, and preferably in conjunction with the use of certain laser parameters. The invention is particularly adapted for producing a perforated titanium sheet which can be used as the functional outer wing leading edge on an aircraft which is critical for laminar flow control efficiency.

Since various changes and modifications can be made in the invention without departing from the spirit thereof, the invention is not to be taken as limited except by the scope of the appended claims.

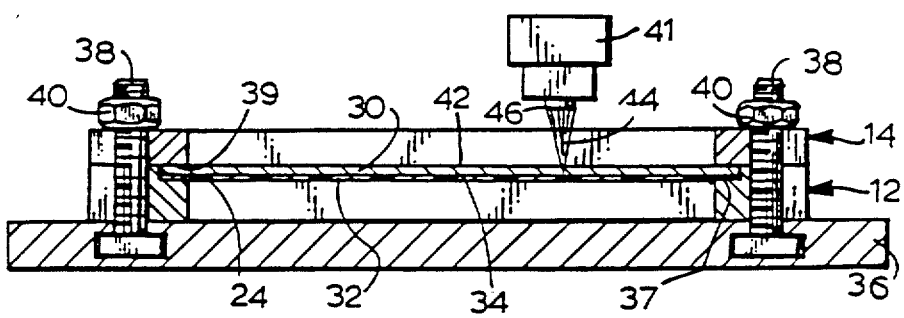

What is claimed is:

1. A process for perforating a metal sheet with holes of substantially uniform size and shape, which comprises:
   placing a suitable transparent backing tape in adhesive contact with one surface of a metal sheet,
   impinging a laser beam generated by a pulsed Nd:YAG laser on the opposite surface of said sheet,
   controlling the laser beam to penetrate the metal sheet and form a plurality of small holes therein but without penetrating through the tape, and
   removing said tape from said metal sheet.

2. The process of claim 1, said metal sheet being a titanium sheet.

3. The process of claim 2, wherein said tape is an adhesive tape selected from the group consisting of transparent polyethylene, polyester and cellophane tapes.

4. The process of claim 2, wherein the titanium sheet has a thickness ranging from about 0.020" to bout 0.032".

5. The process of claim 4, wherein the hole diameter ranges from about 0.002" to about 0.004".

6. The process of claim 5, wherein the ratio of the thickness of the titanium sheet to the hole size is about 10:1.

7. The process of claim 2, wherein said laser has (a) a maximum mean output power of 35–40 watts, (b) a capacitance charge of 600–800 volts, and (c) apertures providing about 400–600 millijoules of output.

8. The process of claim 7, wherein the pusle duration of said laser beam ranges from about 100–150 microseconds, and the repetition rate ranges from about 30 to about 60 Hz.

9. The process of claim 1, wherein the distance from the laser nozzle tip to the work sheet ranges from about 3.5 to about 5 mm.

10. The process of claim 2, employing shielding gases in conjunction with the laser beam, said shielding gases selected from the group consisting of argon, helium, and compressed air.

11. The process of claim 10, wherein the shielding gas is argon.

12. A metal sheet having a plurality of laser-drilled holes of substantially uniform size, said holes having a conical shape from one side of the sheet to the other, and produced by the process of claim 1.

13. A titanium sheet having a large multiplicity of laser-drilled holes of substantially uniform size and of conical shape from one side of the sheet to the other, said titanium sheet adpated for use as the functional outer wing leading edge of an aircraft for laminar flow control, produced by the process of claim 3.

14. A titanium sheet having a large multiplicity of laser-drilling holes of substantially uniform size and of conical shape from one side of the sheet to the other, said titanium sheet adapted for use as the functional outer wing leading edge of an aircraft for laminar flow control, produced by a process which comprises:
   placing an adhesive tape selected from the group consisting of transparent polyethylene, polyester and cellophane tapes, in adhesive contact with one surface of a titanium sheet, said sheet having a thickness of about 0.0020" to about 0.032",
   impinging a laser beam generated by a pulsed Nd:YAG laser on the opposite surface of said sheet,
   controlling the laser beam to penetrate the titanium sheet and form a plurality of small holes therein but withtout penetrating through the tape, said holes having a size of about 0.002" to about 0.004" at the small end thereof, and
   removing said tape from said titanium sheet.

15. The process of claim 1, said holes having a conical shape from one side of said metal sheet to the other.

16. A process for perforating a metal sheet with holes of substantially uniform size and shape, which comprises:
   placing a suitable transparent backing tape in adhesive contact with one surface of a metal sheet,
   impinging a laser beam generated by a pulsed Nd:YAG laser on the opposite surface of said sheet, and
   controlling the laser beam to penetrate the metal sheet and form a plurality of small holes therein but without penetrating through the tape, said holes having a conical shape from one side of the sheet to the other.

17. A process for perforating a metal sheet with holes of substantially uniform size and shape, which comprises:
   placing a suitable transparent backing tape in adhesive contact with one surface of a metal sheet,
   impinging a suitable laser beam on the opposite surface of said sheet,
   controlling the laser beam to penetrate the metal sheet and form a plurality of small holes therein but without penetrating through the tape, and
   removing said tape from said metal sheet.

18. A process for perforating a metal sheet with holes of substantially uniform size and shape, which comprises:
   placing a suitable transparent backing tape in adhesive contact with one surface of a metal sheet,
   impinging a suitable laser beam on the opposite surface of said sheet, and
   controlling the laser beam to penetrate the metal sheet and form a plurality of small holes therein but without penetrating through the tape, said holes having a conical shape from one side of the sheet to the other.

* * * * *

UNITED STATES PATENT AND TRADEMARK OFFICE
CERTIFICATE OF CORRECTION

PATENT NO. : 4,857,698

DATED : August 15, 1989

INVENTOR(S) : Kenneth R. Perun

Page 1 of 2

It is certified that error appears in the above-identified patent and that said Letters Patent is hereby corrected as shown below:

The title page should be deleted to appear as per attached sheet.

Column 4, line 55, "Due to the focusing of the laser beam in order" should be deleted; line 68, "having" should be changed to --have--.

Column 7, line 29, "bout" should be changed to --about--.

Column 8, line 4, "laser-drilling" should be changed to --laser-drilled--; line 13, "0.0020""should be changed to --0.020"--.

Signed and Sealed this

Ninth Day of October, 1990

Attest:

HARRY F. MANBECK, JR.

Attesting Officer

Commissioner of Patents and Trademarks

United States Patent [19]

Perun, et al.

[11] Patent Number: 4,857,698
[45] Date of Patent: Aug. 15, 1989

[54] LASER PERFORATING PROCESS AND ARTICLE PRODUCED THEREIN

[75] Inventors: Kenneth R. Perun, Los Angeles, Calif., and Kevin J. Baker, Peter G. Thompson and Robin S. Woolhead, all of Rugby, England

[73] Assignees: McDonnell Douglas Corporation, Long Beach, Calif.; Lumonics, Limited, Rugby, England

[21] Appl. No.: 171,800

[22] Filed: Mar. 22, 1988

Related U.S. Application Data

[63] Continuation of Ser. No. 66,488, Aug. 26, 1988, abandoned.

[51] Int. Cl.⁴ ............................................. B23K 26/00
[52] U.S. Cl. ........................... 219/121.71; 219/121.84
[58] Field of Search ............ 219/121.7, 121.71, 121.68, 219/121.69, 121.67, 121.72, 121.84

[56] References Cited

U.S. PATENT DOCUMENTS 4,081,653 3/1978 Koo et al. ...................... 219/121.79

FOREIGN PATENT DOCUMENTS 0180687 9/1985 Japan ............................. 214/121.71

Primary Examiner—C. L. Albritton
Attorney, Agent, or Firm—Max Geldin

[57] ABSTRACT

A process for perforating a metal sheet with clean holes of substantially uniform size and shape comprises placing a suitable transparent backing tape, such as an adhesive polyethylene tape, on one surface of the metal sheet. The assembly is placed in a fixture, a laser beam generated by a pulsed Nd:YAG laser is impinged on the opposite surface of the metal sheet, and the laser parameters are chosen to control the laser beam to penetrate the metal sheet and form a plurality of small tapered holes therein without penetrating the tape. A clean metal surface results around the holes with no recast structure or dross present in and around the holes. A drilled titanium sheet of the above type is particularly suited for utility as an outer wing leading edge of an aircraft and which provides good laminar flow control efficiency.

18 Claims, 2 Drawing Sheets